April 7, 1970 E. J. McCUNE 3,504,971
EXPOSURE CONTROL FOR COLOR PRINTERS
Filed Jan. 22, 1968

ELLSWORTH J. McCUNE
INVENTOR.
BY Daniel E. Sragow
Robert W Hampton
ATTORNEYS

United States Patent Office 3,504,971

Patented Apr. 7, 1970

3,504,971

EXPOSURE CONTROL FOR COLOR PRINTERS

Ellsworth Jacob McCune, Webster, N.Y., assignor to Eastman Kodak Company, Rochester, N.Y., a corporation of New Jersey Filed Jan. 22, 1968, Ser. No. 699,523
Int. Cl. G03b 27/76
U.S. Cl. 355—38 3 Claims

ABSTRACT OF THE DISCLOSURE

In a subtractive printer wherein actuators introduce a plurality of filters into the printing beam to terminate exposure to corresponding primary colors, an exposure control is provided which increases the exposure of a primary color in accordance with the amount of unwanted absorption of a particular filter which has been inserted. Summing amplifier means integrate the time during which each color is exposed, and the amplification of the summing amplifier means is varied in accordance with the amount of unwanted absorption of the light passing through the filter which is in the printing beam at the time.

BACKGROUND OF THE INVENTION

In a subtractive printer which inserts a filter into the printing beam when the photosensitive medium has received the proper quantity of exposure to a primary color there arises a problem of unwanted absorptions. Since the filter is not perfect, a magenta filter, for instance, will have a small percentage of cyan and yellow filtration. Thus in addition to terminating the exposure to green, it will also attenuate the exposure to red and blue. The same type of unwanted absorptions occur when cyan filtration is used and to a lesser extent when yellow filtration is used.

At this point it should be observed that decreased color correction is not always a disadvantage. The lower the level of correction, the less likelihood there is of having color subject failure. However, for example, when an out-of-the-ordinary illuminant is used for exposing the negative to be printed, full correction is necessary in order to render a pleasing print.

In those instances where full color correction is desired, full correction can be obtained by placing the photosensors in the printing beam so that the sensors will detect the unwanted absorption and adjust the printing times of the respective colors accordingly. However, in many applications it is not feasible to place the photosensors in the printing beam. It is to these instances that the instant invention is directed.

SUMMARY OF THE INVENTION

It is therefore an object of the invention to provide an electrical network which will compensate for the unwanted absorptions of the filters which are used to terminate exposure to a particular color.

It is a further object of the invention to provide an apparatus which will provide adjustable color correction up to full correction or even over correction, while at the same time providing an apparatus which is simple and inexpensive to manufacture.

These and other objects of the invention are accomplished by providing an additional exposure time interval in accordance with the unwanted absorption of the exposure to the other primary colors. This is accomplished by decreasing the gain of the amplifier which is fed by the photosensor of a particular color so that exposure to that particular color is extended in accordance with the unwanted absorption of the other filter.

BRIEF DESCRIPTION OF THE DRAWING

The invention will be better understood when reference is made to the accompanying drawings wherein.

DESCRIPTION OF THE PREFERRED EMBODIMENT

Figure 1:
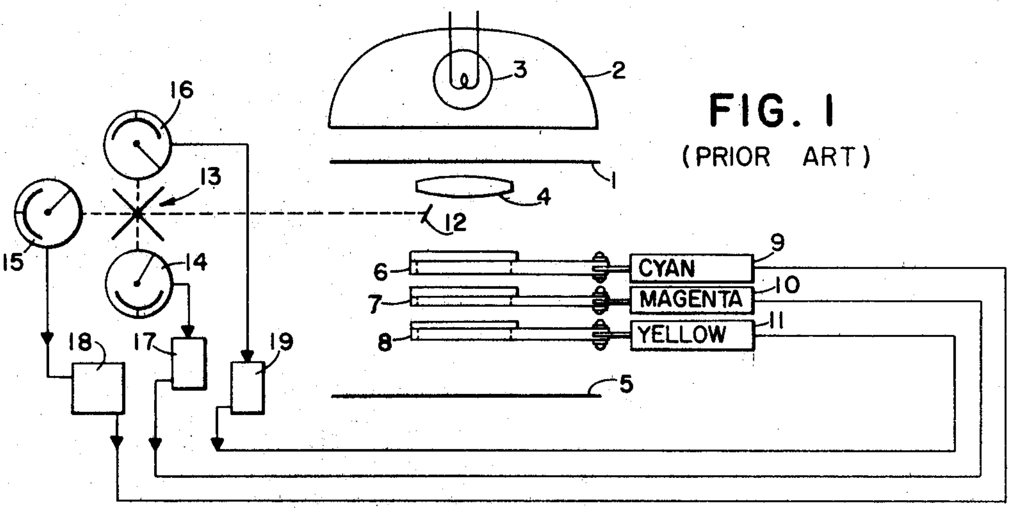
FIG. 1 (PRIOR ART)
FIGURE 1 is a schematic showing of a prior art subtractive printer in which each of the three primary colors are monitored separately.

FIGURE 1 is a schematic showing of the prior art subtractive printer. The negative to be printed is inserted just below lamp housing 2 which contains printing lamp 3. Just below negative 1 is located printing lens 4 which focuses the image of negative 1 onto photosensitive sheet 5. Located between printing lens 4 and photosensitive sheet 5 are three filters 6, 7, and 8 of the colors cyan, magenta and yellow, respectively. These filters are individually mounted on actuators 9, 10, and 11, respectively, which when energized cause the filters to be in the printing beam but when unenergized cause the filters to be withdrawn out of the path of the printing beam. As is obvious to a person skilled in the art, when all three filters are in the printing beam, no light of any color reaches photosensitive sheet 5. Immediately below printing lens 4 is a mirror 12 which reflects a small portion of the printing beam to a beam splitter assembly 13 which directs a portion of the beam to each one of the photosensors, 14, 15, and 16. Each one of the photosensors 14, 15, and 16 is sensitive only to a certain color of light, such as red, green, and blue, respectively. The outputs from the photosensors are fed to summing amplifiers 17, 18, and 19 respectively which detect when the proper exposure (i.e., $E=I \times t$ intensity×time) of light of that particular color has reached the photocell. When this point is reached, the corresponding actuator 9, 10, or 11 causes the corresponding filter to be inserted into the beam to terminate the exposure for that particular color.

Figure 2:
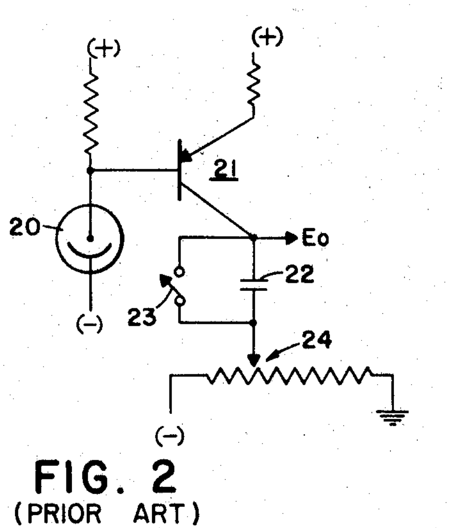
FIG. 2 (PRIOR ART)
FIGURE 2 is a simplified schematic diagram of an exposure control circuit for a particular color as embodied in the prior art apparatus of FIGURE 1.

FIGURE 2 is a simplified schematic diagram of a typical summing amplifier shown in FIGURE 1 as 17, 18, or 19. The output from photosensor 20 is fed to PNP transistor 21 which allows capacitor 22 to charge. As capacitor 22 charges the output voltage from the collector of transistor 21 increases. When the charge reaches a specific level, the output voltage $E_0$ energizes an actuator such as shown in FIGURE 1 as 9, 10, and 11. When exposure has been completed, switch 23 is closed to discharge the capacitor. The level to which the capacitor charges during exposure is determined by the setting of the potentiometer 24.

Figure 3:
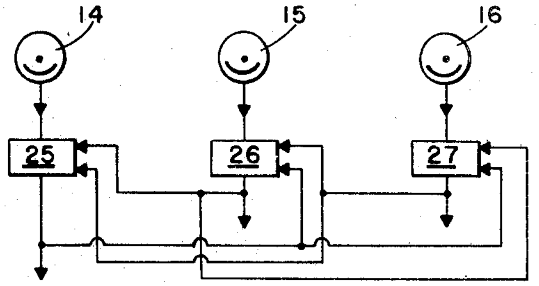
FIGURE 3 is a block diagram of the exposure control according to the invention.

It can be seen from the above that no account is taken of the unwanted absorptions of the respective filters. FIGURE 3 shows a simple solution to this problem. The outputs of photosensors 14, 15, and 16 are fed to summing amplifiers 25, 26, and 27. The summing amplifiers, however, have been redesigned so that they are adapted to take into account the state of the output of each of the other summing amplifiers. In this way, exposure can be increased due to the unwanted absorption of the other filters. It is to be noted that the outputs of the summing amplifiers are fed to each of the other summing amplifiers.

Figure 4:
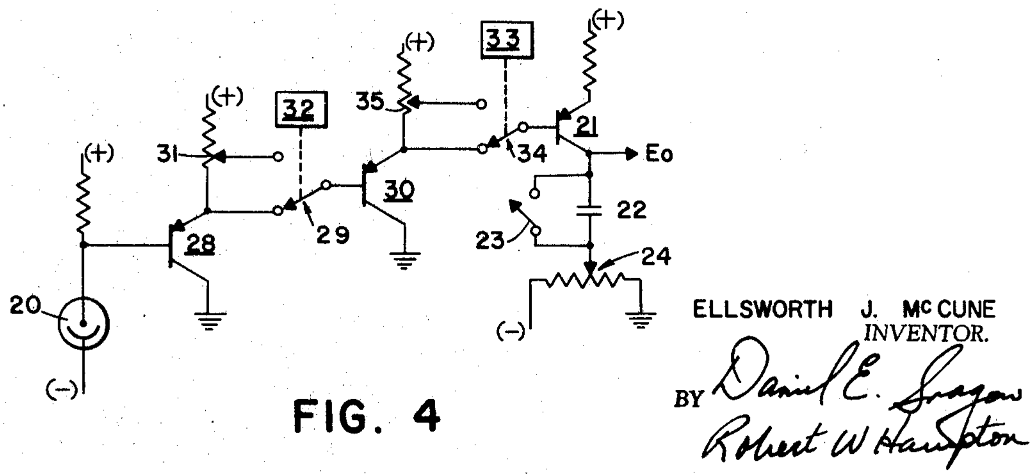
FIGURE 4 is a simplified schematic diagram of an exposure control for a particular color according to the invention.

FIGURE 4 shows a simplified schematic diagram of a typical summing amplifier as is used in the invention. The circuit corresponds to items 25, 26, and 27 of FIGURE 3. The output of photosensor 20 is fed to PNP transistor 28 which acts as an emitter follower. When switch 29 is in the position shown, the emitter follower has a gain of unity. However, when the switch is in its upper position, the gain is somewhat lower and it is determined by the position of potentiometer 31. The same is true of PNP transistor 30. The output of the emitter follower which includes transistor 30 is fed to transistor 21 which controls the charge of capacitor 22 in the same manner as shown in FIGURE 2.

Switches 29 and 34 are actuated by transducers 32 and 33. Transducers 32 and 33 are fed by the outputs of the summing amplifiers for the other colors. For instance, if the amplifier of FIGURE 4 is being used to regulate the green exposure, actuators 32 and 33 could be fed from the output of the amplifiers for the red and blue controlling amplifiers.

The unit operates as follows: Photodector 20 is sensitive to light of a particular color. For purposes of explanation it will be assumed that photodector 20 is sensitive to green. The voltage on the base of transistor 21 is therefore a function of the intensity of the green component of the light passing through negative 1. If either the cyan or the yellow filters are inserted in the beam, either transducer 32 or 33, respectively, will be energized to change the position of switches 29 or 34, respectively. The actuation of the transducers tends to lower the gain of the respective emitter follower to allow additional exposure to the green component of the printing beam to compensate for the unwanted absorption of the cyan and/or yellow filter. The degree of compensation is controlled by potentiometers 31 and 35. As in the circuit shown in FIG. 2, the termination of exposure, capacitor 22 is shorted out by switch 23 in order to bring its charge back to zero.

It is to be again pointed out that each of the summing amplifiers 25, 26, and 27 would be identical and would have a circuit similar to that of FIGURE 4.

The coupling between transducers 32 and 33 and their respective switches can be by any known means. The simplest method is the use of a relay. However, a transistorized switch would provide good results.

It is to be noted that the photosensors have been shown as photodiodes. However, it is within the contemplation of the invention to use any other type of photosensor that would be suitable such as phototransistors, photoresistors, photovoltaic cells and multiplier phototubes. Furthermore, the electronic components in the circuits have been shown to be transistors. It is equally within the contemplation of the invention to use vacuum tubes. It is also within the contemplation of the invention to use operational amplifiers of various types instead of the emitter followers shown.

Although the invention has been described in considerable detail with reference to a certain preferred embodiment thereof, it will be understood that variations and modifications can be effected without departing from the spirit and scope of the invention.

I claim:

1. An exposure control apparatus for a color printer, said exposure control apparatus comprising:

(a) at least three movable subtractive filters, each of said filters having the property of absorbing light of a different color, (b) at least three photosensors, each one of said photosensors being sensitive to light of a different one of the colors absorbed by said filters, (c) at least three summing amplifiers, each one of said summing amplifiers corresponding to a different one of said filters, (d) actuator means coupled to each of said photosensors through said corresponding summing amplifiers, and coupled to each of said filters for controlling the individual movements of said filters in response to light incident on said photosensors, and (e) means coupling each of said three summing amplifiers to each of the other two summing amplifiers, said coupling means comprising means for decreasing the amplification of each of said summing amplifiers as a function of the outputs of said other two of said summing amplifiers.

2. An exposure control apparatus for a color printer adapted to produce a beam of light to be passed through an original to be printed, said apparatus comprising:

(a) a plurality of filters positionable in the beam;

(b) a plurality of actuator means, each coupled to a corresponding filter for selectively moving said filters into and out of the beam;

(c) a plurality of photosensors each sensitive to light of a different color, said photosensors being adapted to produce an output current;

(d) summing amplifier means for electrically coupling said photosensors to said actuators; and (e) means for varying the amplification of said summing amplifier means as a predetermined function of the output current of at least one of said photosensors, so as to compensate for unwanted absorptions of said filters.

3. An exposure control for a color printer comprising at least three subtractive filters, photosensor means corresponding to each one of said filters, each of said photosensor means being sensitive to light of a different color, actuator means for controlling the individual movement of each of said filters in response to light incident on said photosensor means, each of said photosensors being coupled to said actuators through a summing amplifier, the improvement comprising:

means coupling each of said summing amplifiers to each of said other summing amplifiers, said coupling means comprising means for decreasing the amplification of said summing amplifiers as a predetermined function of the outputs of the other of said summing amplifiers, so as to compensate for unwanted absorptions of said filters.

References Cited

UNITED STATES PATENTS

| | | | |
|---|---|---|---|
| 3,241,435 | 3/1966 | Craig et al. | 355—38 |
| 3,350,981 | 11/1967 | Neale | 355—38 X |
| 3,359,424 | 12/1967 | Dreyfoos | 355—38 X |

NORTON ANSHER, Primary Examiner

R. A. WINTERCORN, Assistant Examiner

U.S. Cl. X.R.

355—68

Disclaimer 3,504,971.—*Ellsworth Jacob McCune*, Webster, N.Y. EXPOSURE CONTROL FOR COLOR PRINTERS. Patent dated Apr. 7, 1970. Disclaimer filed Jan. 31, 1974, by the assignee, *Eastman Kodak Company*.

Hereby enters this disclaimer to claims 1, 2 and 3 of said patent.

[*Official Gazette August 27, 1974.*]